(12) United States Patent
Maki et al.

(10) Patent No.: US 6,975,802 B1
(45) Date of Patent: Dec. 13, 2005

(54) DAMASCENE OPTICAL WAVEGUIDES

(75) Inventors: Paul A. Maki, Harvard, MA (US); Susan C. Palmateer, Harvard, MA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 11/136,802

(22) Filed: May 26, 2005

(51) Int. Cl.[7] ............................................. G02B 6/10
(52) U.S. Cl. ....................................... 385/129; 264/24
(58) Field of Search ............................... 385/129–131, 385/147; 264/24

(56) References Cited

U.S. PATENT DOCUMENTS

| | | | |
|---|---|---|---|
| 6,639,249 B2 * | 10/2003 | Valliath | 257/88 |
| 6,753,200 B2 * | 6/2004 | Craighead et al. | 438/48 |
| 2002/0072243 A1 * | 6/2002 | Craighead et al. | 438/745 |
| 2003/0203205 A1 * | 10/2003 | Bi et al. | 428/402 |
| 2004/0209392 A1 * | 10/2004 | Craighead et al. | 438/48 |
| 2005/0023656 A1 * | 2/2005 | Leedy | 257/678 |
| 2005/0174191 A1 * | 8/2005 | Brunker et al. | 333/33 |

* cited by examiner

Primary Examiner—Akm Enayet Ullah
(74) Attorney, Agent, or Firm—William G. Auton

(57) ABSTRACT

A method for fabricating electromagnetic waveguides. The primary expected application is for the formation of dielectric type waveguides suitable for the confinement and guidance of intra-red and visible wavelengths. A secondary application is the formation of waveguides which can be filled with liquids or gases. The method uses standard microelectronic processing techniques.

2 Claims, 3 Drawing Sheets

Planarized waveguide structure. Surface of wafer has been polished using chemical-mechanical polishing, removing Silicon Nitride from the areas outside the waveguide mold, isolating the guide, and smoothing the top surface of the guide.

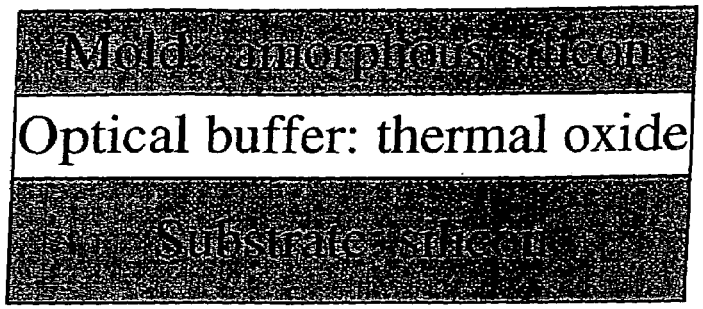

Figure 1: Starting layer stack consisting of an optical buffer on a silicon substrate, with a top layer of amorphous silicon, which will function as a the molding layer for the waveguide.

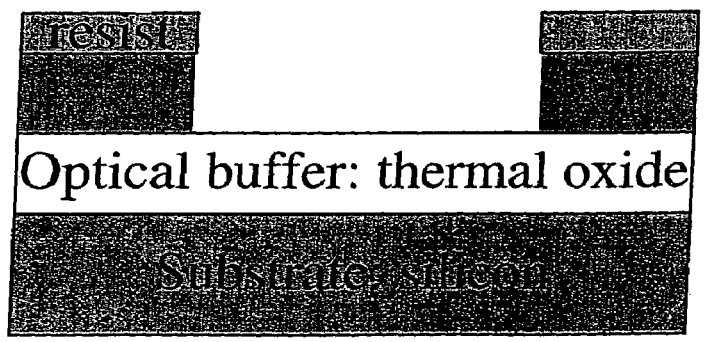

Figure 2: Patterned mold layer. The pattern is defined by coating the surface with a resist, exposing the resist with optical lithography, developing the resist, and transferring the pattern by etching the open areas using plasma etching.

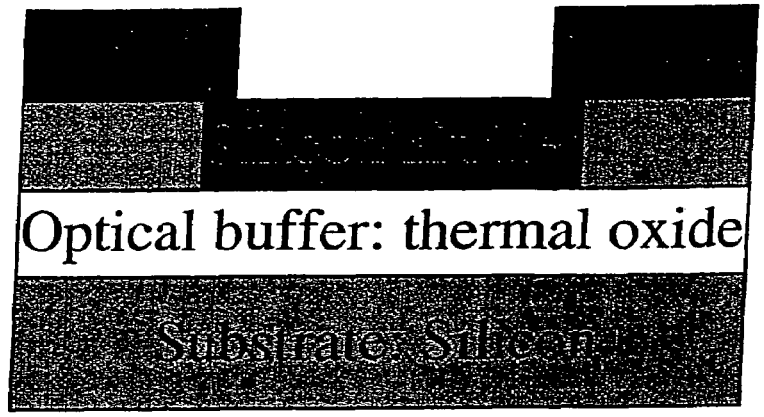

Figure 3: Filled waveguide mold. The patterned wafer has been cleaned, and Silicon Nitride has been deposited using a chemical-vapor-deposition process.

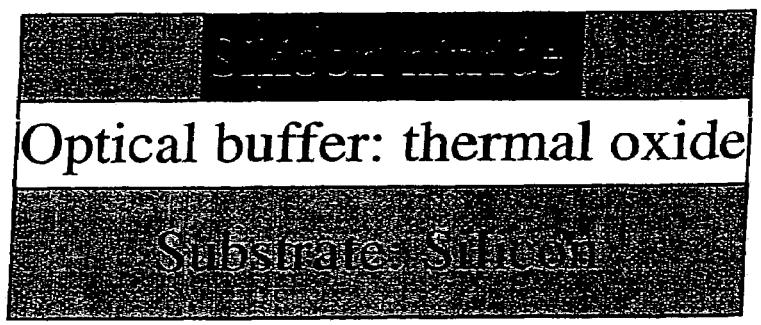

Figure 4: Planarized waveguide structure. Surface of wafer has been polished using chemical-mechanical polishing, removing Silicon Nitride from the areas outside the waveguide mold, isolating the guide, and smoothing the top surface of the guide.

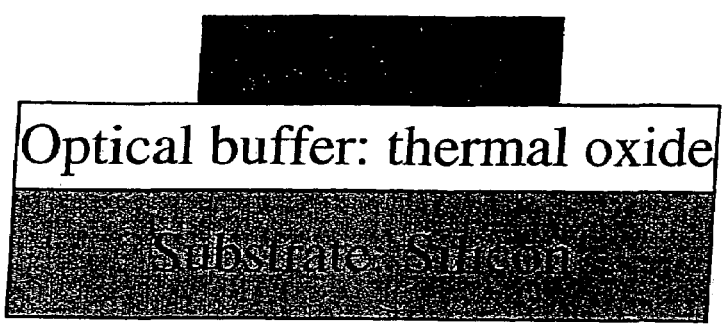
Figure 5:   Mold removal. Mold material has been removed using a selective etch, leaving the Silicon Nitride guide lying on the thermal oxide.
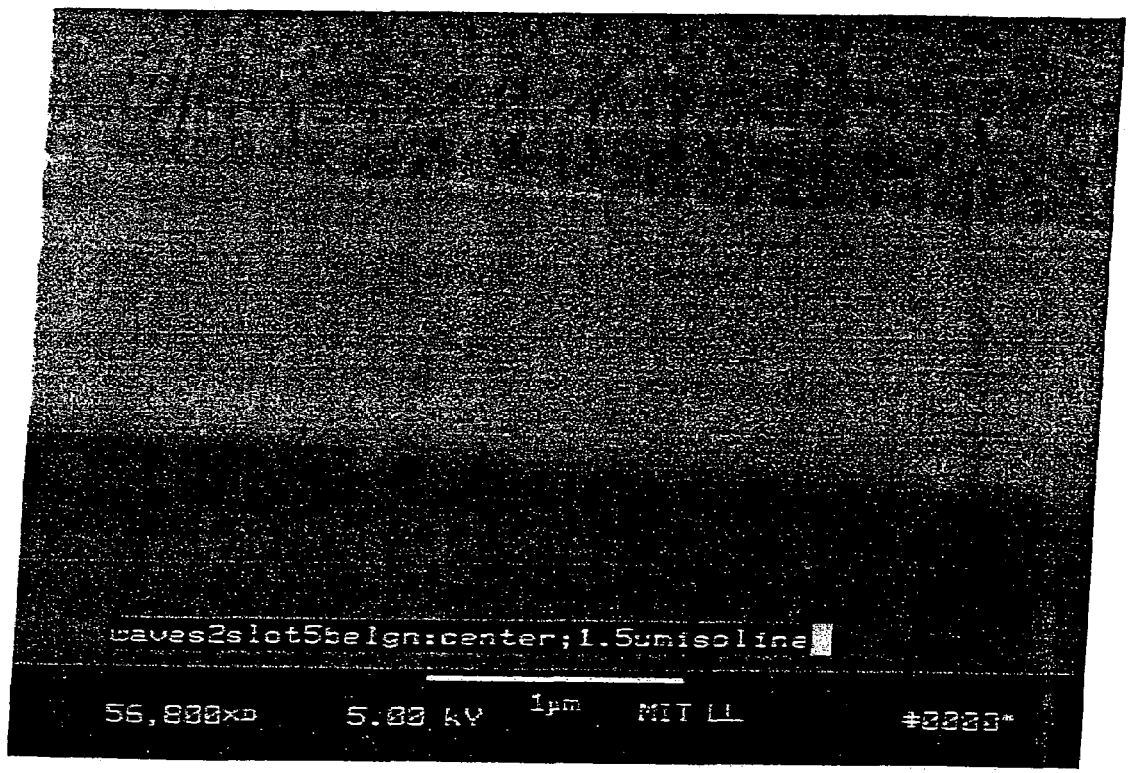
Figure 6:   Scanning electron micrograph of an isolated Silicon nitride waveguide, 1.5 μm wide, on top of a 1 μm thick thermal oxide buffer layer, on a 6-in silicon substrate.

DAMASCENE OPTICAL WAVEGUIDES

STATEMENT OF GOVERNMENT INTEREST

The invention described herein may be manufactured and used by or for the Government for governmental purposes without the payment of any royalty thereon.

BACKGROUND OF THE INVENTION

The invention relates generally to planar waveguides, and more specifically, it relates to a process of fabricating a damascene optical dielectric waveguide.

Present methods of planar waveguide formation on substrates consist of a thin film deposition of the waveguide material and subsequent patterning of the material using lithography and an etching process to transfer the pattern from a resist layer into the waveguide material.

Patented art of interest includes the following U.S. patents, the disclosures of which are incorporated herein by reference:

U.S. Pat. No. 6,775,453 issued to Allman,
U.S. Pat. No. 6,480,643 issued to Hornbeck, and
U.S. Pat. No. 6,324,313 issued to Allman The Hornbeck reference describes a graded index of refraction optical waveguide is formed in interlayer dielectric material located above a substrate an integrated circuit-like structure. The waveguide includes a refractive layer of optically transmissive material surrounding a core of optically transmissive material within a trench in the dielectric material.

The second Allman patent describes an optical waveguide extends vertically within the interior of an IC-like structure to route optical signals between horizontal waveguides in different layers of horizontal optical interconnects. A light reflecting structure is positioned at the intersection of the horizontal and vertical waveguides to reflect the light.

In both Allman patents, the waveguide is formed with a light reflective structure at an intersection of the horizontal and vertical waveguides, and the waveguide is completed using damascene fabrication techniques.

As pointed out by Hornbeck the typical waveguide is formed of light transmissive material which is surrounded by an opaque cladding material. Optical signals propagate through the channel, guided by the cladding material. As the optical signals propagate through a particular waveguide, the signals impinge on the cladding material. If the index of refraction of the cladding material is lower than the index of refraction of the material within channel, the majority of the impinging light signal reflects from the cladding material and back towards the center of the channel. Thus the signal propagates through the channel as a result of reflection at the interface of the cladding material. While damascene fabrication steps are typically used in building electrical integrated circuits, these techniques may also be applied to optical waveguide fabrication, as discussed below.

SUMMARY OF THE INVENTION

The process of the invention consists of the definition of a mold of the exterior shape of the waveguide in a planar surface. A mold material which has good processing characteristics, such as amorphous silicon, is formed on top of an optical buffer material such as thermal oxide, overlaying a substrate. The mold layer is patterned using a lithography process combining a resist and an etching process to transfer the features into the mold layer. The mold is filled with the dielectric material using conventional methods of deposition such as chemical-vapor deposition, evaporation, or liquid dispensing and curing. The mold and dielectric material are then planarized using a polishing process to remove excess dielectric material, and to form the top surface geometry of the guide. Once the surface has been planarized, a new molding layer can be formed on top of the surface, and a new molded waveguide structure can be defined which may act separately, or may provide for electromagnetic coupling between the layered waveguide circuits. As a final step, the mold can be removed by a selective process which leaves the waveguides clad by a gas ambient or vacuum on the top and sides, or the guides can subsequently be imbedded in additional materials which may enhance the electromagnetic or structural properties of the guides.

DESCRIPTION OF THE DRAWINGS

FIG. 1: Shows a starting layer stack consisting of an optical buffer on a silicon substrate, with a top layer of amorphous silicon, which will function as a molding layer for the waveguide.

FIG. 2: Shows a patterned mold layer. The pattern is defined by coating the surface with a resist, exposing the resist with optical lithography, developing the resist, and transferring the pattern by etching the open areas using plasma etching.

FIG. 3: Shows a filled waveguide mold. The patterned wafer has been cleaned, and Silicon Nitride has been deposited using a chemical-vapor-deposition process.

FIG. 4: Shows a planarized waveguide structure. Surface of wafer has been polished using chemical-mechanical polishing, removing Silicon Nitride from the areas outside the waveguide mold, isolating the guide, and smoothing the top surface of the guide.

FIG. 5: Shows the mold removal. Mold material has been removed using a selective etch, leaving the Silicon Nitride guide lying on the thermal oxide.

FIG. 6: Shows a scanning electron micrograph of an isolated Silicon Nitride waveguide, 1.5 $\mu$m wide, on top of a 1 $\mu$m thick thermal oxide buffer layer, on a 6-in silicon substrate.

DETAILED DESCRIPTION OF THE PREFERRED EMBODIMENT

The invention includes a method for fabricating optical electromagnetic waveguides. The primary expected application is for the formation of dielectric type waveguides suitable for the confinement and guidance of infra-red and visible wavelengths. A secondary application is the formation of waveguides which can be filled with liquids or gases. The method uses standard processing techniques, starting with the definition of a mold of the exterior shape of the waveguide in a planar surface. A mold material which has good processing characteristics, such as amorphous silicon, is formed on top of an optical buffer material such as thermal oxide, overlaying a substrate (FIG. 1). The mold layer is patterned using a lithography process combining a resist and an etching proves to transfer the features into the mold layer (FIG. 2). The mold is filled with the dielectric material using conventional methods of deposition such as chemical-vapor deposition, evaporation, or liquid dispensing and curing (FIG. 3). The mold and dielectric material are then planarized using a polishing process to remove excess dielectric material, and to for the top surface geometry of the guide (FIG. 4). Once the surface has been planarized, a new molding layer can be formed on top of the surface, and a new molded waveguide structure can be defined which may act separately, or may provide for electromagnetic coupling between the layered waveguide circuits. As a final step, the mold can be removed by a selective process which leaves the waveguides clad by a gas ambient or vacuum on the top and sides (FIG. 5), or the guides can subsequently be imbedded in additional materials which may enhance the electromagnetic or structural properties of the guides. FIG. 6 shows a micrograph of a completed guide. Another embodiment of the waveguide mold is to cap the mold with a cover, and fill the waveguide with liquid or gas such that the interaction of the optical energy and the material is enhanced, in order to measure some properties of the liquid or gas, or effect some change on the optical signal. Surface roughness, which causes power loss through optical scattering, can be present in the initial starting surface of the film, or can be introduced into the sidewalls of the waveguide itself in the patterning and etching processes. This roughness can be the result of difficulties in producing smooth film deposition, or poor etch properties of the waveguide material. The advantage of the method disclosed here is that the mold material is chosen such that the patterning and etching process produce smooth sidewalls, so that when the waveguide material fills the mold, the waveguide replicates the smoothness necessary for low-loss waveguides. The use of a polishing step to remove excess material from the top also produces a smooth surface on the top, which simplifies the application proves of the waveguide material, since obtaining a smooth top surface during the initial formation of the waveguide film is unnecessary. Another advantage is that the ability to form subsequent overlaying waveguides or other structures is easily accomplished since the surface is planarized after the polishing step. In conventional methods, the surface would have to be planarized by filling the surface with a material and then smoothing the surface with a polishing step, since steps in the surface could cause discontinuities in waveguides which followed a step topology on the surface. Another advantage is that waveguide coupling sections are more accurately fabricated. The reason is that the mold is the inverse of the waveguide coupling section, with isolated ridges of mold material defining the coupling gap. The width of the gap, at 0.1 and 0.3 μm, is close to the minimum feature size that can be realized in the conventional lithography and etching process. At this limit, isolated mold ridges are easier to fabricate than isolated slots, hence the mold process is preferred. The opportunity for the confinement liquids or gases in a guide structure is unique.

Integrated planar waveguide structures are under active and intense development due to the requirements of the telecommunications industry to deploy low-cost high-functionality optical switching and optoelectronic interface circuitry between consumers and long-haul optical fiber networks. The method disclosed here provides a means of incorporating a wide variety of materials into low-loss waveguides through the use of a waveguide mold, the ability to created three-dimensionally structured optical circuits using conventional silicon processing techniques, and a natural path towards integration with silicon microelectronic circuits. Another application is the development of waveguide sensors, whereby light, confined to a waveguide, can interact through fringing fields with a gas or liquid ambient such that a property of the gas or liquid can be deduced or measured. Another sensor application is the confinement of the gas or liquid to a mold structure with a cover, passing the light directly through the gas or liquid ambient.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process of fabricating on optical waveguide comprising the steps of:
    forming a mold in amorphous silicon over a thermal oxide optical buffer material which overlays a substrate;
    patterning a mold layer using a resist and etching sub step to transfer a predetermined pattern in the mold;
    filling the mold with a dielectric;
    planarizing a surface of the mold; and
    removing the mold to leave behind an optical waveguide.

2. A process, as defined in claim 1, wherein said filling step is accomplished using chemical vapor deposition of the dielectric into the mold.

* * * * *